(12) United States Patent
Dietrich et al.

(10) Patent No.: US 8,850,172 B2
(45) Date of Patent: Sep. 30, 2014

(54) ANALYZING PERFORMANCE OF COMPUTING DEVICES IN USAGE SCENARIOS

(75) Inventors: Aaron Dietrich, Bothell, WA (US); Sylvain Goyette, Laval (CA); Van Stephen Lanning, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 267 days.

(21) Appl. No.: 12/946,229

(22) Filed: Nov. 15, 2010

(65) Prior Publication Data

US 2012/0124363 A1 May 17, 2012

(51) Int. Cl.
*G06F 9/00* (2006.01)
*G06F 11/34* (2006.01)

(52) U.S. Cl.
CPC ........ *G06F 11/3466* (2013.01); *G06F 2201/81* (2013.01); *G06F 11/3442* (2013.01); *G06F 11/3452* (2013.01); *G06F 2201/86* (2013.01)
USPC ................................ 713/1; 713/100; 718/104

(58) Field of Classification Search
USPC ................................ 713/1, 100; 718/104, 105
See application file for complete search history.

(56) References Cited

U.S. PATENT DOCUMENTS

| | | | |
|---|---|---|---|
| 5,107,497 A | 4/1992 | Lirov et al. | |
| 7,263,632 B2 | 8/2007 | Ritz et al. | |
| 7,352,706 B2 | 4/2008 | Klotz et al. | |
| 7,441,154 B2 | 10/2008 | Klotz et al. | |
| 7,571,076 B2 | 8/2009 | Matsuzaki et al. | |
| 7,577,770 B2 * | 8/2009 | Tanaka et al. | 710/18 |
| 7,606,814 B2 | 10/2009 | Deily et al. | |
| 7,664,048 B1 | 2/2010 | Yung et al. | |
| 7,797,404 B1 * | 9/2010 | Knight | 709/220 |
| 8,131,843 B2 * | 3/2012 | Yellin et al. | 709/224 |
| 2002/0152305 A1 * | 10/2002 | Jackson et al. | 709/224 |
| 2002/0169658 A1 | 11/2002 | Adler | |
| 2003/0145125 A1 | 7/2003 | Horikawa | |
| 2004/0054776 A1 | 3/2004 | Klotz et al. | |
| 2004/0057389 A1 | 3/2004 | Klotz et al. | |
| 2004/0059807 A1 | 3/2004 | Klotz et al. | |
| 2004/0078667 A1 | 4/2004 | Salem | |
| 2004/0153863 A1 | 8/2004 | Klotz et al. | |

(Continued)

OTHER PUBLICATIONS

Saidi et al., "Full System Critical Path Analysis," Apr. 2008, 12 pages, .eecs.umich.edu/~stever/pubs/ispass08.pdf.

(Continued)

*Primary Examiner* — Thuan Du
(74) *Attorney, Agent, or Firm* — John Jardine; Kate Drakos; Micky Minhas

(57) ABSTRACT

Techniques for conducting an automated analysis of operations carried out during the critical path for a usage scenario and suggesting ways in which the configuration of the computing device could be changed to affect performance of the computing device. Computing devices can be operated in a variety of usage scenarios and users may notice the performance of a computing device in certain usage scenarios more particularly. Critical path analysis of operations conducted in these usage scenarios can be used to identify a critical path of the usage scenario, from which changes that could be made to the computing device to affect performance could be identified. Once the changes that could be made are identified, suggestions can be made to the user, such that a user is able to make changes to the configuration to affect performance when the user has little knowledge about how to improve configurations.

20 Claims, 9 Drawing Sheets

(56) References Cited

U.S. PATENT DOCUMENTS

| | | | |
|---|---|---|---|
| 2005/0060574 A1 | 3/2005 | Klotz et al. | |
| 2005/0060598 A1 | 3/2005 | Klotz et al. | |
| 2005/0076113 A1 | 4/2005 | Klotz et al. | |
| 2005/0210331 A1 | 9/2005 | Connelly et al. | |
| 2006/0005080 A1 | 1/2006 | Walker et al. | |
| 2006/0101416 A1 | 5/2006 | Callahan et al. | |
| 2006/0256726 A1 | 11/2006 | Jennings | |
| 2007/0207800 A1 | 9/2007 | Daley et al. | |
| 2007/0239766 A1* | 10/2007 | Papaefstathiou et al. | 707/102 |
| 2008/0001956 A1* | 1/2008 | Markovic et al. | 345/522 |
| 2008/0040634 A1 | 2/2008 | Matsuzaki et al. | |
| 2008/0059972 A1* | 3/2008 | Ding et al. | 718/105 |
| 2008/0127108 A1 | 5/2008 | Ivanov et al. | |
| 2008/0140469 A1* | 6/2008 | Iqbal et al. | 705/7 |
| 2008/0215922 A1 | 9/2008 | Cheng et al. | |
| 2009/0044176 A1 | 2/2009 | Cascaval et al. | |
| 2009/0063387 A1 | 3/2009 | Beaty et al. | |
| 2009/0282404 A1 | 11/2009 | Khandekar et al. | |
| 2009/0300166 A1 | 12/2009 | Chen et al. | |
| 2009/0320021 A1 | 12/2009 | Pan et al. | |
| 2010/0070319 A1 | 3/2010 | Prafullchandra et al. | |
| 2010/0107143 A1 | 4/2010 | Emberling | |
| 2010/0223425 A1 | 9/2010 | Meagher et al. | |
| 2010/0295856 A1 | 11/2010 | Ferreira et al. | |
| 2011/0004443 A1 | 1/2011 | Horikawa | |
| 2012/0173928 A1 | 7/2012 | Bohrer et al. | |

OTHER PUBLICATIONS

White Paper, "Automating Root-Cause Analysis: EMC Ionix Codebook Correlation Technology vs. Rules-based Analysis," Nov. 2009, 12 pages, .emc.com/collateral/software/white-papers/h5964-automating-root-cause-analysis-wp.pdf.

Sandeep et al., "Cluebox: A Performance Log Analyzer for Automated Troubleshooting," 2008, 7 pages, .usenix.org/event/was108/tech/full_papers/sandeep/sandeep.pdf.

Cohen et al., "Capturing, Indexing, Clustering, and Retrieving System History," Oct. 2005, 15 pages, .hp1.hp.com/techreports/2005/HPL-2005-158.pdf.

Yuan et al., Automated Known Problem Diagnosis with Event Traces—Published Date: Apr. 2006, pp. 375-388, .cs.cmu.edu/~nlao/publication/older/p375-yuan.pdf.

Android, "Traceview: A Graphical Log Viewer, " Original publication date unknown, retrieved Aug. 11, 2010, 5 pages, //developer.android.com/guide/developing/tools/traceview.html.

Compuware, "Application Performance Management," Aug. 5, 2010, 2 pages, compuware.com/solutions/application-performance-management.asp.

De Vitt, D., "Tracing Resource Consumption of Solaris™ PC NetLink Software," Sun BluePrints™, Dec. 1, 1999, 13 pages, .sun.com/blueprints/1299/tracingsolaris.pdf.

Gopalakrishnan, S., "Capturing and Analyzing an ETW Trace (Event Tracing for Windows)," Feb. 26, 2009, 2 pages, http://blogs.msdn.com/b/sudeepg/archive/2009/02/25/capturing-and-analyzing-an-etw-trace-event-tracing-for-windows.aspx.

Final Office Action mailed Mar. 4, 2013 in U.S. Appl. No. 12/946,228, 5 pages.

International Search Report and Written Opinion mailed Nov. 2, 2011 in PCT application PCT/US2010/061343, filed Dec. 20, 2010, 9 pages.

Non-Final Office Action mailed Nov. 20, 2012 in U.S. Appl. No. 12/946,228, 16 pages.

Notice of Allowance mailed Mar. 21, 2013 in U.S. Appl. No. 12/946,228, 6 pages.

* cited by examiner

ANALYZING PERFORMANCE OF COMPUTING DEVICES IN USAGE SCENARIOS

BACKGROUND

Users of computing devices expect timely operation of those computing devices and completion of tasks performed by the computing devices. Users are often frustrated when a task takes longer than they expect. Such frustration may lead to the user developing a negative impression of a manufacturer of hardware of the computing device and/or a developer of software installed on the computing device.

Reducing or eliminating such negative impressions is clearly desirable for these manufacturers and developers. For many tasks, however, the timeliness of execution of the task by the computing device depends on the overall configuration of the computing device and depends less on individual pieces of hardware and software installed on the computing device. A task may execute very quickly on one type of computing device that has a first configuration, but may execute very slowly on the same type of computing device with a different configuration. Thus, manufacturers and developers have a limited ability to improve their individual products to improve performance of a computing device. Instead, changing a configuration of a computing device would increase the speed with which tasks are carried out.

SUMMARY

A change in configuration of a computing device may affect performance of the computing device. However, users are often unable to make changes to the configuration of a computing device because they do not know how to make such changes or because they do not know what changes could affect performance. Applicants have recognized and appreciated that automated analysis of some operations of a computing device may yield useful information about a configuration of a computing device. Additionally, Applicants have recognized and appreciated that, when analyzed, this information about the configuration could provide suggestions to a user on changes to be made to a configuration.

Applicants have further recognized and appreciated that some particular operations carried out by a computing device may yield particularly useful information about the configuration, such that analyzing these operations may provide information that is more valuable than information provided by other operations. A computing device may be used by a user in a variety of ways, including in various usage scenarios. Applicants have recognized and appreciated that analyzing operations carried out by the computing device during a usage scenario may provide information that can be used to suggest changes to a configuration of the computing device. For example, a critical path analysis can be conducted on operations that are carried out during a usage scenario to identify, for that computing device, a critical path of the usage scenario. Changes to the configuration that may affect the critical path of the usage scenario can then be identified from an analysis of the critical path. Changes to the critical path may affect overall operation of the computing device in the usage scenario.

Described herein are various principles for analyzing operations carried out during the critical path for a usage scenario and suggesting ways in which the configuration of the computing device could be changed to improve performance of the usage scenario. In accordance with some of these principles, a general critical path for a usage scenario can be identified. As the critical path for a usage scenario may vary for a particular computing device, computing devices may be analyzed, using information about the general critical path, to determine the critical path of the usage scenario on a particular computing device. For example, on a particular computing device, tracing functionality can be enabled such that operations carried out during the critical path can be identified. The particular computing device can then be operated in the usage scenario and the traces analyzed to identify a sequence of operations carried out during the usage scenario. Based on the analysis, suggestions can be made regarding how to change the configuration of the computing device to affect performance of the usage scenario. For example, if the traces indicate that the computing device has exhibited a pattern of operations indicative of a particular, known configuration for which an improvement has been developed, such as a problem caused by an outdated version of a piece of software for which a new version is available, a recommendation can be made to update the configuration of the computing device with the improvement.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
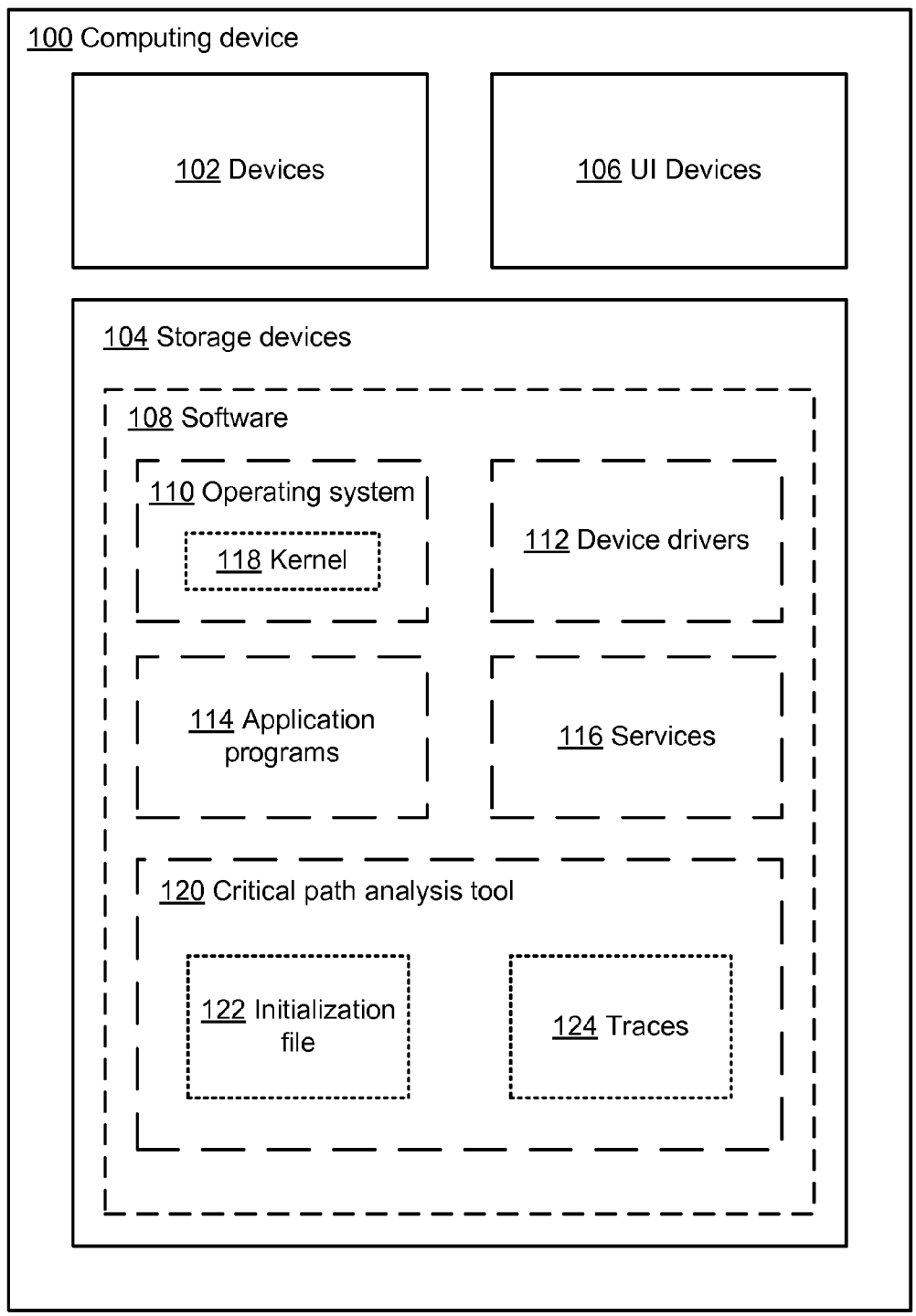
FIG. 1 is a block diagram of one exemplary computing device with which embodiments may operate and that shows various components of the computing device that form a part of the configuration of the computing device.

Applicants have recognized and appreciated that automated analysis of a computing device may yield useful information about the configuration of a computing device. Applicants have further recognized and appreciated that, based on the results of this automated analysis, changes that could be made to a configuration of a computing device to affect performance of the computing device could be identified and suggested to a user.

More particularly, Applicants have recognized and appreciated that critical path analysis can be used to reveal information about a configuration of a computing device. Computing devices can be operated by users in a variety of ways, including in various usage scenarios. Each usage scenario may have a critical path that can be diagnosed during an automated critical path analysis. Information about the critical path of the usage scenario can be used to identify potential changes that could be made to a configuration of the computing device that may affect performance of the computing device in general and/or during that usage scenario.

Described herein are various principles regarding performing a critical path analysis on a computing device. In some embodiments, the critical path analysis can be used to analyze operations of a computing device carried out during a usage scenario and identify a critical path for the computing device in that usage scenario. The critical path for the computing device may be identified based at least in part on information about a general critical path for the usage scenario. As the critical path on particular computing devices may vary based on configuration, the general critical path may be useful to identify the critical path on a particular computing device. When a critical path for the computing device is identified, information about a configuration of the computing device can be determined from the critical path and, from the information about the configuration, changes that could be made to the configuration to affect performance can be identified. Suggestions on changes can then be provided to a user, such that a user can determine how to change the configuration of the computing device to affect performance. In these embodiments, a user without knowledge of how to make configuration changes and/or what changes to make can, using the suggestions, make changes to affect performance. The experience of a user may be improved when these changes that affect performance are made.

Embodiments that operate in accordance with some or all of the principles described herein can be advantageous in various contexts. Applicants have recognized and appreciated that changing the software configuration of a computing device to affect performance may not be simple in many cases. For example, when a computing device is in the possession of an end-user, the user may install hardware/software or take other actions that have an impact on the configuration of the computing device. The end-user may not, however, have sufficient knowledge to change the configuration of the computing device to affect performance. Because access by manufacturers and developers to a computing device possessed by an end-user is limited, manufacturers and developers would have difficulty changing a configuration of that computing device. Thus, when the computing device is in the possession of the end-user, making changes to the configuration to affect performance may be difficult.

This problem is not limited to computing devices in end-users' possession, though. Changing the configuration may be similarly difficult before the computing device is provided to an end-user. Access to a computing device may be somewhat easier for manufacturers/developers but, once design of the computing device is finalized and the device is put into production in a factory, the computing device may not be handled by workers skilled at configuring the computing device. The designers may have the ability to change the configuration before the computing device is in production, but may not have the ability to change the computing device during production. This may be a problem because changes may be made to the configuration on the factory floor, during production. For example, some factories may install additional software on a computing device, like application programs that the manufacturer agreed to install, for which the designers did not plan and that may change the configuration of the computing device from what was intended by the designer. Because these installations are done at production time, when workers are not skilled at making configuration changes, making further changes to the configuration to affect performance would be difficult.

Changes made to the configuration by factory workers or other users during production may therefore degrade performance of the computing device. These same users, however, may not be skilled at configuring the computing device or making further changes to affect or improve performance.

Applicants have recognized and appreciated that a tool made available, whether to end-users or computer manufacturers, to automatically detect configuration-related performance issues and suggest improvements may be advantageous. Such an automated analysis tool that could offer suggestions on how to change a configuration of a computing device that can improve performance could enable these same users and factory workers to make changes to the configuration that can improve performance. Improvements in performance could improve the end-user experience.

As discussed above, Applicants have recognized and appreciated that such an automated analysis could be carried out based on analyzing operations of a computing device in a usage scenario. A usage scenario is a set of activities or types of activities that can be carried out by the computing device. In some cases, a usage scenario may be a set of activities or types of activities to achieve a goal or a type of goal. Startup, shutdown, recovering from standby, starting an application program, and executing an application program are examples of usage scenarios for which a performance analysis tool may be provided.

In particular, critical path analysis techniques could be used to carry out such an analysis. Such critical path analysis techniques may evaluate operations in a "critical path" for that usage scenario of a computing device. While a particular usage scenario may vary in some ways between computing devices or between performances of the usage scenario on the same computing device, operations that occur on the critical path of a usage scenario can be characterized by a set of activities or activity types that are carried out during the usage scenario. This set of operations or operation types, because they occur on the critical path, may be the set that affects performance of the computing device during the usage scenario, as any delays in performing the operations or operation types will delay the usage scenario. For example, in some embodiments and in some usage scenarios, a "critical path" of a usage scenario includes the activities engaged in by a computing device when operated in the usage scenario that affect a length of time that the computing device will take to complete execution of the usage scenario. Any activities that do not affect the length of time the computing device will take to complete execution of the usage scenario would therefore not be in the critical path. Thus, in such critical paths, the execution time of activities on the critical path impacts the execution time of the usage scenario. Though, embodiments are not limited to using this type of critical path or any particular type of critical path and embodiments may include any suitable activities or types of activities in critical paths.

A configuration of a computing device can impact a critical path of a usage scenario on that computing device. More particularly, the activities that are included in a usage scenario for a particular computing device may vary based on the configuration of the computing device. For example, one exemplary startup usage scenario may always include loading an operating system kernel and loading device drivers. Loading the kernel and loading the drivers may therefore be activities that form a part of the critical path for startup. However, which operating system kernel and which device drivers are loaded may vary between computing devices. For example, when a first computing device is configured with particular hardware and/or software, different device drivers may be loaded during the startup usage scenario than for a second computing device configured with different hardware and/or software. Thus, the exact operations or operation types that are carried out during a critical path of a usage scenario may vary based on a configuration of a computing device. Nonetheless, the recognizable pattern of activities may occur during the critical path. Analyzing the critical path on a particular computing device, then, may provide some information about the configuration of the computing device. This information about the configuration may provide some insight into how the configuration could be changed to affect performance of the computing device during the usage scenario.

Users may notice the timeliness of completion of tasks by a computing device during certain usage scenarios for a computing device, such as when the computing device is carrying out certain tasks, more than during general use of the computing device. Improving performance of the computing device during these usage scenarios may therefore be noticed more by the user. Accordingly, improving performance of the computing device during some usage scenarios could improve the user's experience and could improve the user's overall impression of the computing device or the software on the computing device. This could correspondingly decrease the likelihood that the user will develop a negative impression of the manufacturer of hardware of the computing device and/or a developer of software installed on the computing device.

In view of the foregoing, in some embodiments described in more detail below, a critical path analysis is carried out on operations of the computing device during a usage scenario. In one embodiment, a computing device is executed in a usage scenario and information is collected regarding the operating state of the computing device during the usage scenario. The collected information is then analyzed to identify behavior patterns in the operating state, which include delays in which a first task waits for a second task to complete before the first task could complete or levels of resource consumption during the usage scenario. Because eliminating or reducing the duration of these delay patterns or reducing the amount of resource consumed can affect performance of the computing device when the computing device is operated in the usage scenario, changes to the configuration of the computing device that would affect these behavior patterns are then identified. For example, the collected information about the operating state can be compared to information about known configuration changes that would affect known behavior patterns that are observed in the operations of the computing device during the usage scenario. As another example, the collected information can be analyzed to identify new behavior patterns, which could be potential areas for configuration changes that could result in improved performance. Identified configuration changes can then be suggested to a user, such that the user can determine how to change configuration of the computing device to affect performance.

In the examples described below, for ease of description a person operating a computing device and receiving information regarding configuration changes is referred to as a user. The user may be any suitable person, including an end-user or a factory worker.

Some exemplary techniques for performing critical path analysis are discussed below. These exemplary techniques may be understood in the context of the exemplary environment of FIG. 1. It should be appreciated, though, that the environment of FIG. 1 is merely illustrative of the types of environments that may be used with the embodiments described below and that others are possible.

FIG. 1 shows a rough sketch of some of the components of an exemplary computing device 100. The computing device 100 includes a variety of hardware and software components that affect the configuration of the computing device. As shown in FIG. 1, computing device 100 includes hardware, including devices 102. Devices 102 may be any type of device that may form a part of a computing device 100 or may be connected to a computing device 100, and as such may be internal or external devices. Examples of devices 102 include input and/or output devices, including interfaces and buses for conveying information to be input or output. The devices 102 may include (though illustrated separately in FIG. 1) a storage device 104 storing software 108 and user interface devices 106 for interacting with users. The software 108 of the computing device 100 includes any suitable computer-executable instructions for execution on a computing device 100. As shown in FIG. 1, the software 108 includes an operating system 110, device drivers 112 for interactions with the devices 102, application programs 114, and services 116 (which may be called daemons in some systems). The operating system 110 includes a kernel 116 that forms a core of the operating system.

Each of the components of the computing device 100 illustrated in FIG. 1 may have an impact on the configuration of the computing device 100, as may other components of a computing device 100 that are not illustrated. For example, the services 116 that are present on the computing device 100 may determine what processes are executing while the computing device 100 is in use, as processes related to the services 116 may always execute in the background and use system resources. Similarly, application programs 114 may be related to processes running in the background or that may run at startup. In some cases, individual services 116 may not have processes that run at all times, but instead only run when particular application programs 114 are installed on the computing device 100 or are executing on the computing device 100. Additionally, which devices 102 are present in the computing device 100 may determine what device drivers 112 are installed or running on the computing device 100.

The components of the computing device 100 therefore determine the configuration of the computing device 100 and affect operations of the computing device 100 at any given time. Usage scenarios of the computing device 100, which are affected by the configuration, are therefore affected by the components of the computing device 100. A usage scenario may be a set of activities related by some common characteristic, like a set of operations carried out at a particular time or to achieve a particular goal. For example, a usage scenario could be a startup of the computing device 100, a shutdown of the computing device 100, a recovery from standby, starting of an application program 114, a steady state operation of the computing device 100 when a user is not actively using the computing device 100, or any other related set of operations. What operations are carried out at the time of the usage scenario depends in part on the configuration of the computing device 100. For example, when trying to start an application program 114, the application program 114 may require some processor time to carry out particular operations. If there are many services 118 executing on the computing device 100, though, those services 116 may need processor time and the application program 114 may be delayed before executing. Operations carried out by the services 116 may form a part of the usage scenario of the computing device, as those operations are carried out during the usage scenario.

A user using the computing device 100 may be impacted by the configuration of the computing device 100. To continue the application program example, a user may experience a delay in opening the application program 114 because of the delay inserted by the operations of the services 116. This delay may dissatisfy the user. A change to the configuration of the computing device 100 could, however, eliminate the delay, such as by changing which services 116 are executing or the way in which the services 116 execute. As discussed above, though, users may not be able to make such changes to the configuration because they are uncertain of how to make such changes or what changes to make.

Automated analysis of the type described herein, however, could assist these users by suggesting changes that could be made to the configuration of the computing device 100 that could affect performance of the computing device 100 during the usage scenario. FIG. 1 shows a critical path analysis tool 120 that can analyze operations of the computing device 100 during a usage scenario. In the embodiment illustrated in FIG. 1, a critical path analysis tool 120 can operate according to parameters outlined in an initialization data set. The initialization data set may be contained in, for example, an initialization file 122, or may be structured in any other suitable manner. For ease of description, in the examples below the initialization data set will be described as an initialization file, but it should be appreciated that embodiments are not limited to structuring the initialization data set as a file of a file system.

The initialization file 122 can be used to configure the critical path analysis tool 120 to analyze operations of the computing device 100 during a usage scenario in a particular manner so as to identify a critical path of the usage scenario. The operations may be analyzed, for example, by enabling logging on particular events occurring on the computing device 100. When the events occur, traces 124 are stored that identify that the event occurred and may optionally indicate a state of the operating system at the time the event occurred. In some embodiments, traces 124 may be created throughout the execution of the computing device in the usage scenario and some or all data of the traces may be stored when one or more of the particular events occurs. In other embodiments, traces 124 may be created upon occurrence of one or more of the particular events. Embodiments are not limited to performing tracing in any particular manner.

Following the usage scenario, these traces 124 can be analyzed by the critical path analysis tool 120 to identify a critical path for the particular computing device in the usage scenario. As discussed above, the critical path for the particular computing device may be determined based at least in part on information about a general critical path for the usage scenario. When the critical path for the particular computing device is identified, the critical path can be used to identify changes that could be made to the configuration of the computing device.

In one exemplary use of the critical path analysis tool 120, an initialization file 122 may be used to configure the critical path analysis tool 120 to analyze a usage scenario that is a startup phase of the computing device 100. The initialization file 122 may indicate that a critical path for a generic startup phase includes the following operation types: start the kernel of the operating system; load and initialize device drivers; load and initialize services; load and initialize application programs configured to be started at startup; load and display the user interface; perform log-on operations for a user; and customize the user interface according to the preferences listed in the user's profile. Each of these operation types is an "activity." Which activities are carried out during the usage scenario on the computing device 100 may vary based on the configuration of the computing device 100, such as a variation in which or how many "load device driver" activities are carried out based on which and how many devices 102 and device drivers 112 are present on the computing device 100. The initialization file 122 may identify, for each activity of the critical path, events that are associated with the activity and that can be used to identify when an activity has been carried out. An event may be any change in state of the computing device 100. An event may occur, for example, when the processor switches from executing one process to another process, or changes from executing one function to another function, or an allocation of memory resources on the computing device 100. Events associated with a "load device driver" activity, for example, may be a start of execution of a particular process and/or executing particular functions.

As events are associated with activities by the initialization file 122, identifying events or sets of events on the computing device 100 can lead to identifying activities that were carried out during the usage scenario. Further, as activities are carried out as part of the critical path, identifying which activities were carried out can determine the critical path for the usage scenario. Which activities were carried out is also related to the configuration of the computing device 100 (e.g., how many "load device driver" activities are carried out depends on how many device drivers are present on the computing device 100). Thus, monitoring particular events that occurred on the computing device 100 during the usage scenario can provide information about the configuration of the computing device 100. The critical path analysis tool 120 can therefore configure the computing device 100 to enable logging for the events specified in the initialization file 122.

The computing device 100 can then be operated in the usage scenario related to the initialization file 122. During operation of the computing device 100 in the usage scenario, the events will occur and traces 124 will be generated and/or stored. Following the usage scenario, these traces can be analyzed to determine the critical path for the usage scenario on the computing device 100.

Once the critical path is identified, the critical path analysis tool 120 can determine whether any behavior patterns exist are recognized in the activities. A behavior pattern may be a pattern of use of the computing device 100 during the usage scenario that could affect performance during the usage scenario. For example, patterns may be sets of operations that are related to delays and levels of resource consumption on the computing device 100. The behavior patterns could be, for example, an observed repetition of a particular behavior during the usage scenario or could be, for example, an observed occurrence of a known pattern during the usage scenario. Known behavior patterns may be associated with known changes to configuration that could affect configuration. For example, a known behavior pattern may be associated with a known bug in a piece of software for which an update is available to fix the bug. When the pattern is observed on the computing device 100 during the usage scenario, then the computing device 100 could be determined to have old software with the bug. The critical path analysis tool 100 could therefore recommend that the user change the configuration of the computing device 100 by updating the old software. For observed repetitions of a particular behavior, impacts of the behavior could be compared to performance metrics that could be identified in the initialization file 122. An impact of the repeated behavior could be, for example, a delay experienced during the usage scenario or resources consumed during the usage scenario as a result of the behavior at each time the behavior is carried out. Based on a comparison of the impact to the performance metrics, a determination could be made regarding whether a recommendation should be made to the user to determine whether a change could be made to components of the computing device 100 associated with the behavior. For example, if a delay experienced as a result of the behavior is more than a threshold delay identified in the initialization file 122, then the critical path analysis tool 120 may determine that a recommendation should be made to the user to investigate software associated with the behavior to determine whether a change can be made to the software. The changes that can be made as a result of detecting behavior patterns could affect performance of the computing device, such as by reducing a consumption of resources or reducing delays experienced during the usage scenario.

The critical path analysis tool 120 can therefore make recommendations to a user regarding changes that could be made to a configuration of the computing device 100 by analyzing operations carried out during a usage scenario. A user can, upon receiving their recommendations, make the recommended changes or determine whether a change is available that matches the recommendation. Users that do not have the knowledge or skills to make changes to configurations on their own may therefore be able to make changes with the assistance of the critical path analysis tool 120. As a result of these changes, performance of a computing device could be improved and a user experience can be improved.

Figure 2:
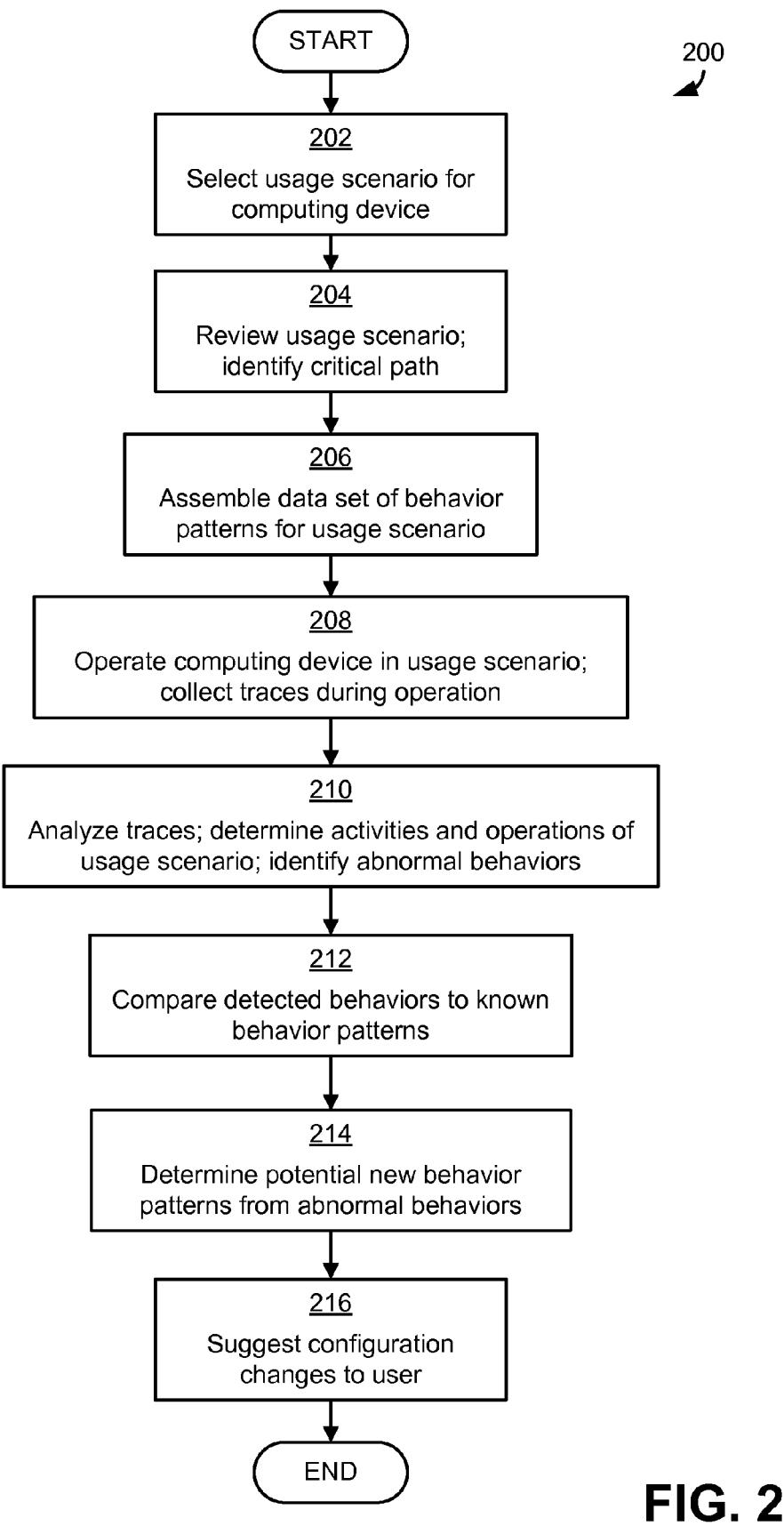
FIG. 2 is a flowchart of one exemplary process for suggesting to a user changes that can be made to a configuration of a computing device to affect performance of the computing device during a usage scenario.

More details regarding ways in which critical path analysis can be performed and in which various embodiments of a critical path analysis tool can be implemented are discussed below in connection with FIGS. 2-7. FIG. 2 illustrates one example of an overall process by which operations of a computing device can be analyzed and FIGS. 3-7 illustrate examples of ways in which particular tasks of the critical path analysis tool can be carried out. Embodiments are not limited to operating in connection with any of the techniques illustrated in or discussed in connection with FIGS. 2-7, as others are possible.

FIG. 2 shows one process 200 that may be carried out to perform a critical path analysis of a computing device. The process 200 begins with preparation operations 202, 204, and 206 that are carried out before one computing device to be analyzed is identified.

In block 202, a usage scenario for computing devices is selected. In block 204, the usage scenario selected in block 202 is reviewed to determine a general critical path of the usage scenario. The general critical path identified in block 204 is a generalized critical path that describes the activities that will be commonly carried out, that must be carried out, or that are optionally carried out during the usage scenario on computing devices in general. In some cases, the critical path of block 204 may not be a list of particular activities. For example, the critical path identified in block 204 may include activities like "load device drivers" for a usage scenario for startup phase of a computing device, rather than configuration-specific activities like "load USB device drivers." Identifying the general critical path in block 204 may include, in addition to identifying which activities will be carried out during a critical path, events that may indicate whether those activities have occurred.

In block 206, a data set of known behavior patterns for the usage scenario is assembled. The data set may include known behavior patterns associated with good behaviors of a computing device, which include those behaviors that do not negatively impact performance of the computing device during the usage scenario, and/or bad behaviors of a computing device, which include those behaviors that negatively impact performance of the computing device during the usage scenario. A behavior pattern may be a pattern of operations carried out during an activity that is related to a configuration of the computing device that leads to the good or bad behaviors. For example, if a piece of software that includes an error is installed on a computing device, that piece of software may cause a delay to be inserted into an activity or cause a lot of resources to be consumed during an activity. This delay or resource consumption may be observable in operations carried out during the activity when that piece of software is present, such as by observing a particular operation of the activity that takes a long time to complete and causes the delay. Behavior patterns in the data set may therefore be associated with patterns in operations, which include patterns in processes or functions associated with one or more operations or the activity, operations carried out during the activity, a time the operation(s) or the activity took to complete, resources consumed during the operation(s) or the activity, or other information about the operation(s) or the activity. In some cases, an activity or activity type, related to a critical path and/or a usage scenario, may be associated with a behavior pattern, such that the behavior pattern can be detected in the context of an activity or a usage scenario. At least some of the information available for a behavior pattern may be stored as a signature for the behavior pattern, which may include the symptoms by which the behavior pattern can be identified when compared to information about operations executed on a computing device and patterns in such operations.

Additionally, the data set of known behavior patterns may include information on changes to configurations that negatively impact performance. For example, if a version of a piece of software includes an error that causes a delay, and a subsequent version of the piece of software fixed the error and does not cause the delay, the change to the configuration may be installing the subsequent version. By placing this information in the data set of block 206, when a known behavior pattern in the data set is matched to a computing device, the change to the configuration may be suggested from the data set.

The data set of block 206 may be assembled in any suitable manner. In some embodiments, the data set is assembled entirely before a critical path analysis tool is used on a particular computing device to analyze that computing device, such that all behavior patterns are known before computing devices are tested. In other embodiments, at least some information on behavior patterns may be assembled before a critical path analysis tool is used on a computing device and additional information on behavior patterns may be collected and added to the data set as the critical path analysis tool is used on computing devices to identify behavior patterns as discussed below.

After the critical path for the usage scenario has been identified and a data set of behavior patterns assembled, information about the critical path may be used to perform a critical path analysis on one or more particular computing devices. Each of the computing devices may have a critical path analysis tool similar to the one discussed above in connection with FIG. 1. Information about the critical path that was determined in block 204 may be input to the critical path analysis tools as, for example, an initialization file.

In block 208, a particular computing device is operated in the usage scenario selected in block 202. During operation in the usage scenario, logs are generated and/or stored when the events identified in block 204 occur on the particular computing device. Upon occurrence of those events, traces are generated and stored that identify an operating state of the computing device at the time the event occurred.

In block 210, after the usage scenario ends, the traces stored in block 208 are analyzed by the critical path analysis tool to identify a critical path for the particular computing device (which may be based at least in part on information regarding the general critical path) and to identify a configuration of the particular computing device. Identifying the configuration may include identifying hardware and/or software installed on the particular computing device or identifying hardware and/or software that is activated and in use on the computing device at the time of the usage scenario. The configuration may be identified based at least in part on the traces stored in block 208. For example, by identifying, from the traces, events that occurred on the particular computing device during the usage scenario, operations that occurred on the particular computing device during the usage scenario can be identified. Carrying out an operation may include executing one or more functions of one or more processes and when the function(s) or process(es) are identified from the traces, the operation can be determined to have been carried out. Particular activities that were carried out during the usage scenario may then be identified based on the operations. Each of these particular activities may be associated with a configuration of the computing device, such as a particular piece of hardware or software, such as where each "load device driver" activity is associated with a particular device driver.

Once the activities and operations, and from them the configuration of the particular computing device, have been identified, abnormal behaviors in the operations can also be identified. The abnormal behaviors may include activities or operations that took unusual amount of time to execute or that used an unusual amount of resources. These behaviors may be observed in operations of the computing device carried out during an activity by comparing delays or resource consumptions to pre-existing information about times and resources used by operations and activities. These abnormal behaviors may impact performance of the computing device in the usage scenario and, using techniques described herein, can be analyzed to determine changes that could be made to a configuration of the computing device to eliminate the abnormal behaviors.

Changes to the configuration may be identified by detecting behavior patterns in information related to each activity identified in block 210, such as by identifying patterns in operations of the activity. In some embodiments, detecting behavior patterns in the operations may include reviewing and/or analyzing traces collected during an activity that relate to the operations to determine some information about the operations. For example, the traces could be analyzed to determine resource consumption during the activities or at times during the activities. As another example, traces could be analyzed to determine delay patterns present in the operations and in the activities. Delay patterns could be, for example, when a particular thread or process is waiting for completion of another thread or process before it can execute, or when a particular thread or process is not able to execute because the thread of process is not being given time on the processor. Resource consumption and delay patterns seen in traces related to events may provide information about operations related to those events. For example, by analyzing traces, information about an execution time of a particular operation, resource consumption during an operation, or operations executed together may be identified.

Information about the operations of an activity may then be aggregated and analyzed together to determine patterns in operations of an activity. These patterns in operations may be behavior patterns that identify patterns in how the computing device was operated during the usage scenario. The behavior patterns may identify information about operations carried out during an activity of the critical path, such as processes or functions associated with one or more operations or the activity, operations carried out during the activity, a time the operation(s) or the activity took to complete, resources consumed during the operation(s) or the activity, or other information about the operation(s) or the activity.

In block 212, operations of activities, which may be related to abnormal behaviors that were identified in block 210, are compared to the data set of known behavior patterns to determine whether the operations match the known behavior patterns. As mentioned above, the known behavior patterns may each be associated with a signature that identifies symptoms of the behavior pattern. Detecting a match may include comparing signatures for the known behavior patterns to the operations identified in block 210. This may include comparing any of the information that may be collected for behavior patterns, including activities with which the known and operations being analyzed are associated, operations included in the pattern, processes and/or functions associated with one or more patterns, times, levels of resource consumption, and/or any other suitable information about operations and/or activities. For example, a set of particular operations that take a certain length of time to execute may be identified as abnormal in block 210 and compared to known behavior patterns in block 212. If a known behavior pattern identifies those operations and that length of time, then the identified operations may be detected to match the known behavior pattern. When such matches are detected, a known behavior pattern may be identified in the activity. As mentioned above, when the known behavior pattern may be associated with a known change to a configuration that can affect performance of a computing device by changing behaviors of the known behavior pattern. For example, a known patch to a piece of software may eliminate a delay created by a bug in that software. When such a known behavior pattern is detected on the particular computing device based on the traces of block 210, the known change may be detected to be applicable to the particular computing device.

In block 214, a determination is made regarding whether any potential new behavior patterns are present in any of the operations identified in block 210, including the operations associated with abnormal behaviors. These new behavior patterns may be behavior patterns that do not match a known behavior pattern, but that may include behavior that could be explored to identify a change in configuration that could be made to affect performance of the computing device. Determining whether any new behavior patterns are present may include reviewing the operations and information about operations of an activity to identify commonalities between operations. Commonalities that are compared may be commonalities that show resource consumption or delay above a threshold. For example, when a particular function of a particular process is observed in traces of several operations inserting a long delay or using a lot of resources, those operations may be identified as a behavior pattern. Because this identified behavior pattern does not match any known behavior patterns, these operations can then be identified as a potential new behavior pattern that should be investigated to determining whether a change could be made to affect performance of the computing device.

In block 216, once known and new behavior patterns are detected in blocks 212 and 214, information about suggested changes to the configuration can be presented to a user. For known behavior patterns, the known change associated with the known behavior patterns can be suggested. For new behavior patterns, information underlying the known behavior pattern can be presented, such as the activity and/or operations with which the behavior pattern is related, the identified behavior, and the impact of that behavior (e.g., delay created or resources consumed). Once the suggestions are presented in block 216, the process 200 ends. A user can then use the suggestions presented in block 216 to make changes to the configuration of the computing device and therefore affect performance of the computing device. In some cases, once the changes are made, the performance of the computing device in the usage scenario may improve. The end-user's experience may therefore also improve.

As mentioned above, FIGS. 3-7 provide more detailed examples of ways in which the steps of the process of FIG. 2 may be carried out.

Figure 3:
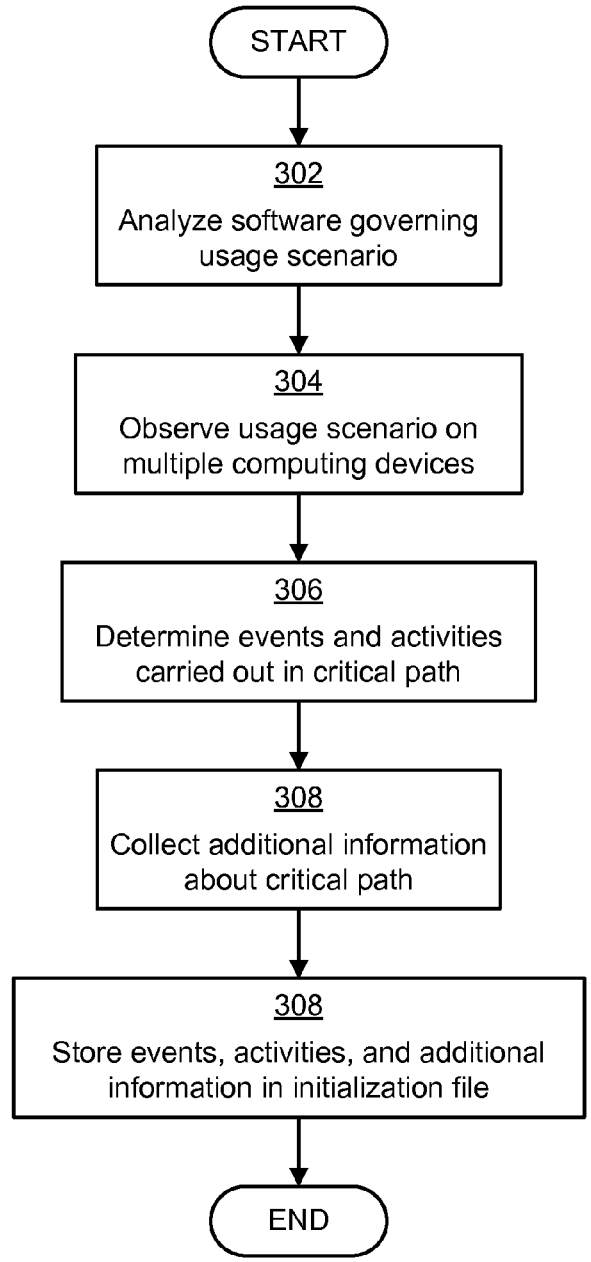
FIG. 3 is a flowchart of one exemplary process for identifying a critical path of a usage scenario.

FIG. 3 illustrates one process for preparing to perform a critical path analysis on a usage scenario. The process 300 is directed to collecting information about a usage scenario in general, rather than on specific computing devices. As discussed above, once information that generally describes the usage scenario is collected, that information can be used to perform a critical path analysis on a particular computing device. Part of the information that generally describes the usage scenario is a critical path for a general case of the usage scenario. The critical path for a general case of the usage scenario is a set of activities or activity types that, in general, form a part of the critical path. On a particular computing device, the exact activities that are carried out or the number of activities may vary, and some usage scenarios may include additional activities. But, in general, a computing device that is operated in the usage scenario will carry out the activities or activity types included in the critical path for the general case.

There are many different usage scenarios for computing devices, as there are many different ways in which a computing device may be used. Because there are many different usage scenarios, there are many different ways in which a computing device may be operated during a usage scenario and many different ways to analyze a usage scenario. The process 300 shows one way in which a usage scenario may be evaluated.

Prior to the start of process 300, a particular usage scenario to be analyzed has been selected. In the selected usage scenario, a particular piece of software exercises some control over the operations carried out in the usage scenario. For example, an operating system of the computing device may exercise such control. This may be the case where the usage scenario is a startup of the computing device, where the operating system identifies and governs the operations carried out during startup. When analyzing the usage scenario, then, analyzing software governing the usage scenario may provide useful information about the usage scenario. Accordingly, in block 302, the software governing the usage scenario may be analyzed. Analyzing the software may include any suitable analysis, including an analysis of the instructions/code of the software. Analysis of the code/software may identify what types of hardware or software interactions are carried out by the software being analyzed, such as what other types of software are triggered to begin executing during the usage scenario. These interactions may, in some cases, be activities that form a critical path of the usage scenario. Additionally, by examining the interactions, events associated with an activity can be identified. For example, processes or functions to be executed and events that are associated with those executions such as context switches can be identified.

Information about a usage scenario could also be gathered from an observation of operations carried out on multiple computing devices being operated in the usage scenario. These operations may assist in identifying what activities generally form a part of a critical path, as the operations commonly carried out on the multiple computing devices can be inferred to form a part of the general critical path. Accordingly, in block 304, multiple computing devices are operated in the usage scenario and the operations executed on the computing devices are observed. Observing the operations may be carried out in any suitable manner, including by analyzing traces regarding some, many, or all operations carried out on the computing devices or other information about operating states of the computing devices during the usage scenarios.

From the information gathered in blocks 302 and 304, a determination can be made in block 306 about the activities and operations that generally form the critical path of the usage scenario, as well as the events that correspond to those activities and operations or that signal that the activities or operations are carried out. The activities and operations can be identified in any particular manner, including as types of operations/activities or as particular operations/activities. A type of an operation/activity may be described by, for example, a purpose or characteristic of an operation/activity, such that particular operations/activities that are carried out on a particular computing device can be matched to the types and determined to be that type of event/activity.

In block 308, additional information about the critical path, including statistical information, may be collected. The statistical information may include metrics against which to measure particular operations/activities of a particular critical path on a particular computing device. For example, an average execution time for the entire critical path may be identified such that an execution time for the entire critical path on one computing device can be compared to the average. As another example, an average execution time of an operation or activity type or a length of an average delay during an operation or activity can be identified. Of course, statistical information other than averages can be collected, including maximums, medians, modes, minimums, and standard deviations, among other types of statistical information. Additionally, the statistical information may relate to properties other than time-based properties, including resource consumption.

In block 310, information about the events, operations, and activities of the critical path and the statistical information about the critical path may be collected and stored in an initialization file. This initialization file may be used to initialize a critical path analysis tool on a particular computing device. Therefore, the initialization file may include information useful to the tool for performing a critical path analysis. For example, the initialization file may contain information about the usage scenario to which the initialization file relates, for which events to collect traces, to which operations and activities events are related and how to identify an operation and/or an activity based on events, and statistical information against which to measure operations/activities when determining a performance of a particular critical path in the context of a general critical path. Any suitable information that may be gleaned from the analysis and observations of blocks 302-308 for initializing a critical path analysis tool may be included in the initialization file.

Once the initialization file is created, the process 300 ends. The initialization file could then be used to initialize a critical path analysis tool to perform a critical path analysis on a particular computing device, as discussed below.

In the discussion of blocks 302 and 304 above, the analysis and observation was discussed in terms of identifying all or common operations and activities carried out during a usage scenario. In some embodiments, though, a selection may be made of particular operations/activities to be included in the critical path. The selection may be done according to what operations/activities are a necessary part of the usage scenario, such that if these events/activities are not completed the usage scenario cannot be completed. The selection may also be done according to what operations/activities may have an impact on an overall duration of the usage scenario. In the latter case, operations/activities that are a part of the usage scenario but that, even if they are delayed, will not cause delays for the usage scenario, are not identified as part of the critical path. This selection may be carried out to focus a critical path analysis tool on the operations/activities that have the largest impact or the most direct impact on the usage scenario, such that changes in configuration that affect these events/activities would affect the performance of the usage scenario. It should be appreciated that embodiments are not limited to performing this selection in any particular manner. Further, embodiments are not limited to carrying out any selection.

For ease of description, some of the techniques that can be used with the critical path analysis described herein are described below in connection with a critical path analysis tool. It should be appreciated, however, that embodiments are not limited to working with any particular type of tool that carries out any particular operations or tasks.

Figure 4:
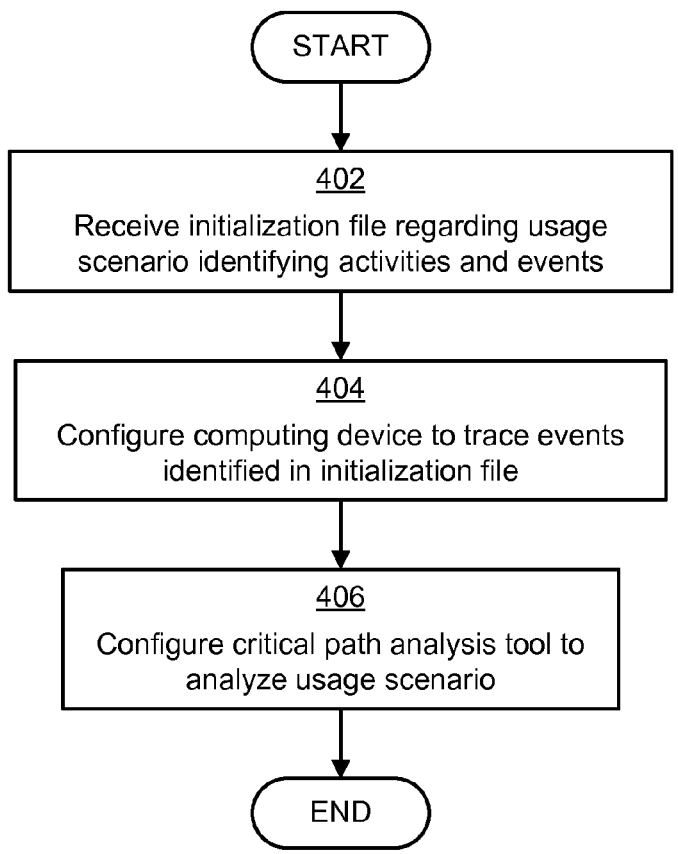
FIG. 4 is a flowchart of one exemplary process for configuring a computing device to log information about operations of the computing device during a usage scenario.

FIG. 4 illustrates one example of a process for initializing a critical path analysis tool on a particular computing device to carry out a critical path analysis of a usage scenario on the particular computing device. Prior to the process 400 of FIG. 4, an analysis of the usage scenario and the critical path in general may be conducted, as discussed above in connection with FIGS. 2 and 3, and a critical path analysis tool may be installed on the particular computing device. During the process 400, the critical path analysis tool may be configured to analyze the usage scenario in a particular manner.

Process 400 begins in block 402, in which the critical path analysis tool receives an initialization file that identifies the manner in which the usage scenario is to be monitored and/or analyzed. The initialization file may contain any suitable information about the usage scenario, a critical path for the usage scenario, or information about how to monitor and/or analyze the usage scenario. For example, the initialization file may contain information about events, operations, and/or activities that form a part of the general critical path for the usage scenario. The initialization file may also contain information about a relationship between events and operations/activities, such that activities and operations carried out during the usage scenario can be identified by identifying events during the usage scenario.

In block 404, the information in the initialization file is used by the critical path analysis tool to initialize the computing device. In particular, in block 404 the critical path analysis tool may be used to configure the computing device to generate traces upon occurrence of events identified by the initialization file. This may be done in any suitable manner, as embodiments are not limited in this respect. In some cases, the critical path analysis tool may configure itself or some facility on the computing device to monitor operations carried out on the computing device for characteristics of an event for which to monitor. When the characteristics are detected, the event may be identified and the operating state of the computing device at that time saved. In other cases, existing tracing functionality may be used. For example, the critical path analysis tool may communicate directly with software on the computing device to request that software to activate tracing and to communicate traces to the critical path analysis tool. As another example, tracing infrastructure may be installed on the computing device, such as tracing functionality that forms a part of an operating system. The Event Tracing for Windows (ETW) functionality of the Microsoft® Windows® operating system, available from the Microsoft Corporation of Redmond, Wash., is an example of such an infrastructure. To use ETW, software installed on the operating system may include instrumentation that, when activated, provides information about events to ETW. Each piece of software may register with ETW and specify the types of events that can be generated by that software. When information about events is desired, ETW can be used to activate the instrumentation in those pieces of software for particular events. When the events occur, each activated piece of software provides some information about the event to ETW and ETW may collect and store information about an operating state of the computing device at that time. Information about the events can then be retrieved from ETW. In some cases, then, a critical path analysis tool may, for each event identified in the initialization file, request that ETW activate tracing for those events. Later, the critical path analysis tool may retrieve information about those events from ETW. Though, as discussed above, any suitable technique for tracing may be used.

In block 406, in addition to configuring the computing device for the critical path analysis, the critical path analysis tool may configure itself for the critical path analysis. Configuring the critical path analysis tool may comprise any suitable actions for preparing the critical path analysis tool to carry out the critical path analysis. In some cases, the configuring of block 406 may include configuring the critical path analysis tool with information about which events are related to which operations, such that when events are detected or observed, those events can be related to operations. Once operations are identified, activities of the critical path to which the operations relate can then be identified. The critical path analysis tool could also be configured with statistical information about the critical path, such as average execution times or average resource consumptions, such that the critical path analysis tool can evaluate whether particular behavior patterns observed in traces are anomalous or are typical for that usage scenario.

After the computing device and the critical path analysis tool are configured in blocks 404 and 406, the process 400 ends.

Following the process 400, the computing device can be operated in the usage scenario and information can be collected during the operating, such that the critical path analysis tool can perform a critical path analysis. In some cases, following the configuration of process 400, the critical path analysis tool may automatically trigger the computing device to begin operating in the usage condition, such as by performing a restart operation such that a startup usage scenario can be observed and analyzed or starting up an application such that an application startup usage scenario can be observed. In other cases, though, the critical path analysis tool can be set up to monitor and analyze the usage scenario and, next time the computing device enters the usage scenario (by user request or in any other way), the monitoring and analysis can be carried out.

Figure 5:
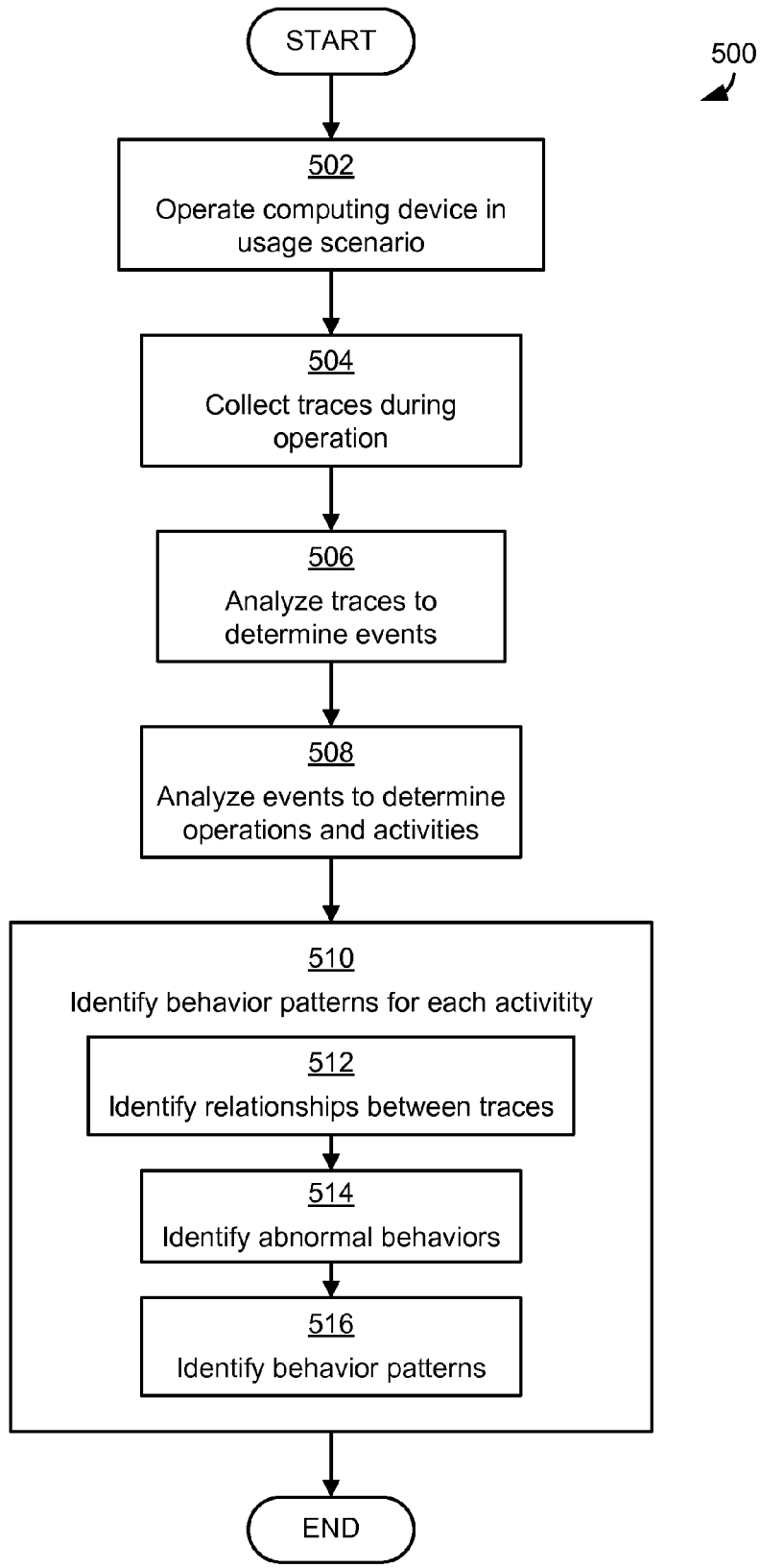
FIG. 5 is a flowchart of one exemplary process for collecting information about an operating state of a computing device during operation of the computing device in a usage scenario.

Regardless of how the computing device begins operating in the usage scenario, once the computing device starts operating in the usage scenario the monitoring and analysis begins. FIG. 5 illustrates one example of a process that may be implemented for monitoring and analyzing operations of a computing device during a usage scenario, including carrying out a critical path analysis on the usage scenario of the computing device.

As discussed above, a usage scenario may vary in some ways between computing devices and may vary between times the computing device is operated in the usage scenario and, as such, activities carried out during the critical path may change between computing devices. These variations may depend on a configuration of the computing device at the time the computing device is operating in that usage scenario. By monitoring events that occur during the use of the particular computing device in the usage scenario and by analyzing these events, operations carried out during the usage scenario can be identified. From the operations, activities carried out during the usage scenario can be identified and a critical path for that particular computing device at that time can be determined from the activities. From the critical path and operations carried out during activities of the critical path, changes to the configuration that affect performance of the usage scenario can be determined and suggested to a user.

The process 500 of FIG. 5 includes various steps of the monitoring and analysis of the critical path analysis. The monitoring of FIG. 5 is carried out in blocks 502 and 504. In block 502, the computing device is used in the usage scenario and carries out various operations as a part of the usage scenario. In block 504, traces are generated during the usage scenario due to occurrence of events for which the generation of traces has been requested.

The analysis begins in block 506 and may be carried out at any suitable time. In some cases, the analysis may begin after the computing device has stopped operating in the usage scenario, while in other cases the analysis may begin during the usage scenario. The computing device may end the usage scenario because the operations of the usage scenario have been fully carried out—for example, for a startup usage scenario, that the computing device is started—or because the usage scenario has been interrupted in some way. When the analysis begins before the end of the usage scenario, the traces may be analyzed as they are generated.

In block 506, the traces generated during operation of the computing device are analyzed to determine events to which the traces relate. The traces are related to events for which the critical path analysis tool requested that traces be generated and the critical path analysis tool should therefore be aware of all the events for which traces were generated. Based on this knowledge, the critical path analysis tool should be able to identify events to which each trace relates. In block 508, the events that were identified in block 506 may be used to determine operations that were carried out during the usage scenario and, from the operations, activities that were carried out during the usage scenario. Information with which the critical path analysis tool was configured (e.g., via an initialization file) may identify a relationship between events, operations, and activities, such that events can be treated as signals that an operation and/or an activity has been carried out. The activities for which the information identifies a relationship with operations and events are those activities that form a part of the critical path. Thus, by identifying the activities carried out during the usage scenario, a critical path for that usage scenario on that computing device at that time can be identified.

Once the critical path for the usage scenario on the particular computing device is identified from the events, operations, and activities, the critical path can be analyzed in block 510. In particular, the critical path can be analyzed in block 510 to determine whether any behavior patterns exist in the operations of the activities of the critical path that have an affect on the performance of the critical path. As discussed above, behavior patterns that have an impact on the performance of the critical path may have an impact on the performance of the usage scenario as a whole. Accordingly, if changes could be made that affect these behavior patterns, those changes could also affect performance of the critical path and the usage scenario. More particularly, if a behavior pattern has a negative impact on the performance of the critical path and a change could be made to mitigate or eliminate that negative impact, that change would have a positive impact on the performance of the critical path and the usage scenario. This positive impact on performance could also have a positive impact on the end-user's experience.

The analysis of block 510, therefore, includes identifying behavior patterns in the operations of activities of the critical path that have an affect on the performance of the critical path. Such behavior patterns include patterns in behaviors that affect timing of operations of the usage scenario and patterns in behaviors that affect resource consumption during the usage scenario. A behavior that affects timing could, for example, cause delays or slow execution of operations. Such behaviors that affect timing include wait conditions, where a process or thread is held in a waiting state as the process/thread waits for completion of an operation of another process/thread. A behavior that affects resource consumption could, for example, lead to a temporary exhaustion of those resources that prevents other processes/threads from obtaining resources and thus prevents those other processes/threads from executing, which may cause delays in an operation or in other operations, which may cause delays in an activity. Such resources that may be consumed include processor time, memory, and communication bandwidth (local bus bandwidth or network bandwidth), among others.

As a first step in block 510, in block 512 the traces that were collected in block 504 may be reviewed in aggregate to determine relationships between traces. For example, once the traces have been analyzed a performance analysis tool can determine, from the information contained in the traces, relationships between processes and threads that were executed during the critical path. Each of the traces may contain information about a particular process or a particular thread, or functions of processes and threads. Identifying relationships between traces, however, can aid in identifying chains of functions, processes, and threads that were carried out. For example, by reviewing the information in aggregate, a particular sequence of functions or processes carried out during an activity or a portion of an activity can be identified, which is referred to as a chain. Such chains may be useful to identify root causes of delays, such as identifying a particular function or process that several other functions/threads/processes were all waiting to complete. Reviewing an individual trace may identify that a function or process was delayed, but may not provide a reason. Instead, by identifying relationships and chains, a set of functions/processes in the chain that were all waiting for one function/process to complete can be identified. This one process/function for which the others were waiting may be the root cause of the other delays. In this way, a root cause of a delay can be identified. Similarly, reviewing the traces may identify root causes of problems of resource consumption, such as identifying a particular process that was using a lot of resources and preventing the computing device from allocating resources to other processes. For example, a trace may identify that one process may have spent a long time in an executing state but unable to carry out operations because the process was not being allocated time on the processor. Reviewing the traces in aggregate may identify that, at that time, another process was using a lot of processor time, which is the root cause of the other process not obtaining processor time. Identifying a chain of processes at a time and resources consumed by those processes may provide more information than merely identifying that some processes could not obtain resources. Accordingly, as a first step, the traces may be analyzed to determine relationships between traces and identify chains. The traces that are analyzed together in this way may be traces related to operations of individual activities that were identified in block 508. By doing so, root causes of potential problems can be identified within each activity and solutions can be identified per activity of the critical path.

The aggregate analysis of traces may be carried out in any suitable manner. In some cases, existing performance analysis tools may be used. For example, some embodiments may perform a performance analysis on the trace data using the xperf tool that is a part of the Microsoft® Windows® Performance Toolkit, available from the Microsoft Corporation of Redmond, Wash. Other embodiments may use different performance analysis tools or may apply any known performance analysis process.

As a second step of the analysis of block 510, in block 514, behaviors that are out of the ordinary may be identified in the data determined in block 512. For example, behaviors that lead to delays and/or resource consumption levels that are above ordinary for activities and/or operations are identified. This identification may be done using statistics regarding the usage scenario or activities of the usage scenario that may have been included in an initialization file. These statistics may be compared to delays or resource consumption levels for an activity to identify delays and resource consumption levels that are, according to the statistics, to be above average or abnormal in any other manner. This comparison may be used to filter out delays and resource consumption levels that are within normal range or below a threshold, such that no time is spent analyzing normal delays or normal resource consumption.

As a third step of the analysis of block 510, in block 516 behavior patterns are identified in the operations of the activity that relate to the out-of-ordinary behaviors identified in block 514. The behavior patterns may be identified in operations of an activity in which the behaviors were detected. Identifying a behavior pattern may be carried out in any suitable manner, including using exemplary techniques described below in connection with FIG. 6. In some embodiments, identifying behavior patterns may comprise identifying one or more occurrences of known patterns and/or identifying patterns that were not previously known in operations of an activity or information about the operations. Such patterns may correspond to known behavior patterns, in that the behavior pattern may have been previously identified as corresponding to good or bad behavior of a computing device during the usage scenario. A known pattern can be identified when the behavior pattern occurs only once in the operations of an activity, such that the behavior pattern need not be a repetition of operations in the activity. As another example, identifying patterns that were not previously known may include examining the operations to try to identify repetitions or commonalities between operations or information about operations like chains associated with one or more operations. Identifying the commonalities may include identifying any suitable common characteristic(s) between operations and/or chains. For example, if multiple operations are identified that include chains having delays that have as a root cause a particular function of a particular process, then that commonality between chains may be identified as a commonality and as a new pattern in operations.

After behavior patterns in the operations are identified in block 516, the process 500 ends. Following the process 500, as discussed in greater detail below, the behavior patterns identified in block 516 may be identified to the user and suggestions regarding how to change a configuration of the computing device to mitigate or eliminate the impact of the behavior pattern may be identified to the user. Such identification processes are discussed in greater detail below in connection with FIG. 7.

Figure 6:
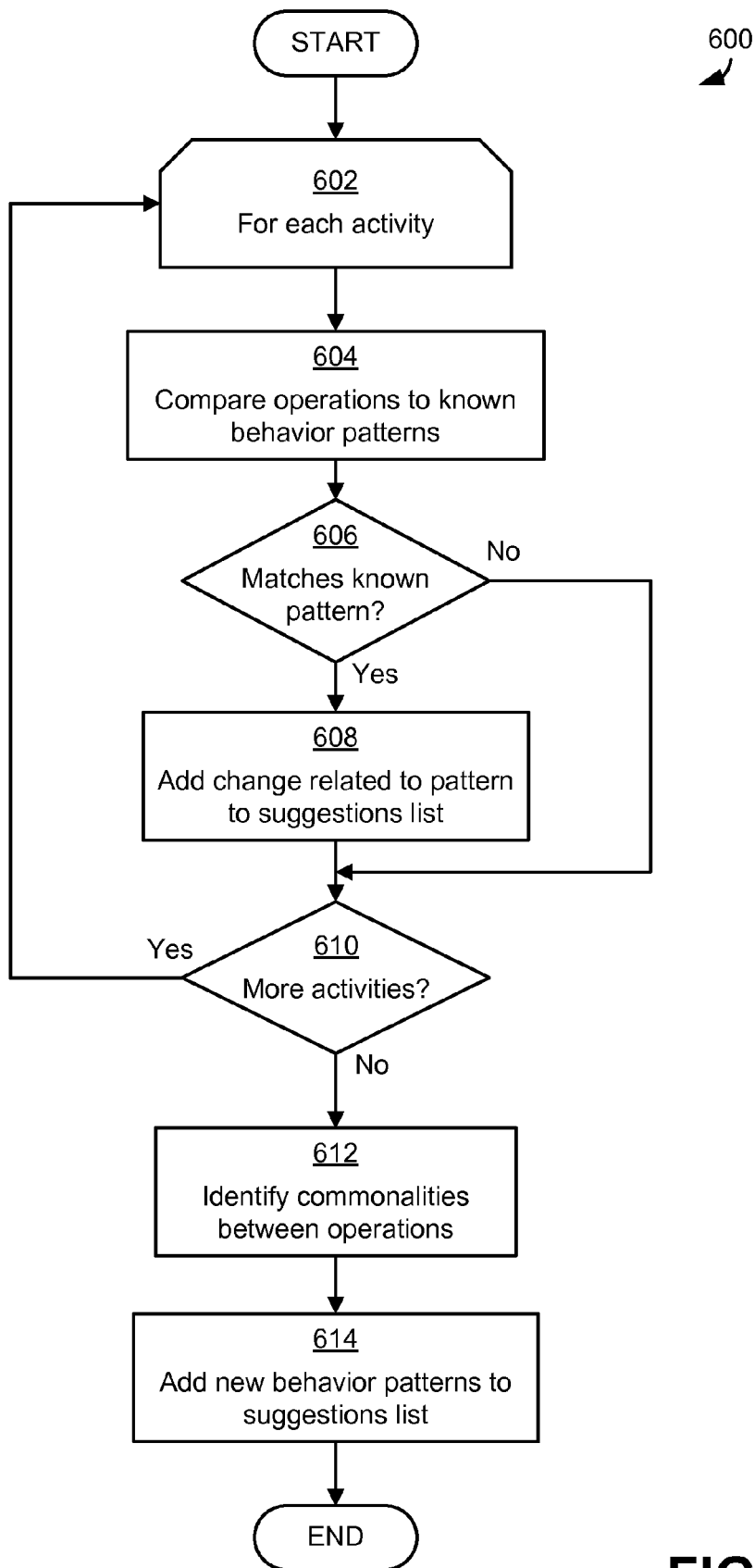
FIG. 6 is a flowchart of one exemplary process for analyzing information about an operating state of a computing device to identify changes that could be made to a configuration of the computing device to affect performance during a usage scenario.

FIG. 6 illustrates one exemplary technique for identifying behavior patterns in operations of activities of a computing device when used in a usage scenario, which may be based on an analysis of operations and/or information about operations. In embodiments which implement a process similar to the process 500 of FIG. 5, the process 600 of FIG. 6 may be implemented as a part of the processing of block 516.

Prior to the start of the process 600, a computing device was operated in a usage scenario, traces were generated during the usage scenario, and the traces were analyzed to identify relationships between the traces and root causes of delays and resource consumption indicated in chains. Additionally, operations carried out were identified based on the events and chains and activities carried out were identified based on the operations. The process 600 identifies, based on operations of the activities and information about the operations, behavior patterns present in the activities.

The process 600 begins in block 602, in which a loop that examines operations of an activity is started for each of the activities to be analyzed for behavior patterns. The activities to be analyzed may be those that include abnormal delays or abnormal resource consumption, as discussed above in connection with block 514 of FIG. 5. In block 604, at least some of the information regarding an activity or operations of the activity is used to determine whether the operations match a known behavior pattern. Each known behavior pattern may be associated with characteristics of operations or characteristics of chains for operations that can be used to identify the known behavior pattern. For example, a known sequence of operations for an activity combined with a known level of resource consumption during the activity may identify a known behavior pattern. These characteristics of the operations and/or information about operations may be included in a signature for a known behavior pattern. By determining whether the signature for the known behavior pattern can be seen in the operations of the computing device during the usage scenario, a determination can be made as to whether operations of the computing device match the known behavior pattern.

Accordingly, in block 604, the information regarding the activity selected in block 602 is compared to performance signatures for known behavior patterns so as to determine whether the behavior patterns can be seen in the operations of the activity or the information about the operations. The information regarding an operation may include information on a chain related to the operation, like the functions, processes, delays, or resource consumption levels for the chain, or may include information about a performance time for the operation, resources consumed during the operation, and other operations executed alongside the operation. The information regarding the operation could also include information on the events by which the operation was identified or any suitable information derived from a trace related to the operation.

The comparison of chains to signatures for known behavior patterns may be carried out in any suitable manner. In some cases, a data set of signatures may be maintained locally, on the computing device being evaluated by a critical path analysis tool, remotely, on a server, or in any other location. Information about the chain selected in block 602 may be compared to the signatures in the data set to determine whether there is a match.

In block 606, a determination is made regarding whether the operations of the activity selected in block 602 match any known behavior patterns by comparing a signature for each known behavior pattern to information about the operations of the activity. If not, then the process 600 continues to block 610. If, however, the operations match a known behavior pattern, then the known behavior pattern can be used to identify a potential change in configuration that could be made on the computing device to affect performance of the computing device in the usage scenario. Each known behavior pattern may be associated with a change in configuration. For example, a change in configuration may be an update for a piece of software that may reduce a delay in a function or process or reduce resources consumed by the software so as to affect performance of the computing device. The change in configuration may be designed to address known performance issues on computing devices that are associated with a known behavior and the signature for a behavior pattern may be the symptoms of those performance issues. Thus, when the signature is observed in the information about the operations of the activity, then the change in configuration may be deemed applicable to the computing device. In block 608, therefore, changes in configuration associated with each matched behavior pattern are added to a set of changes in configurations to be suggested to a user.

In block 610, a determination is made regarding whether there are more activities to review for known behavior patterns. If so, then the process 600 returns to block 602 to select another activity. If not, then the process 600 continues to evaluate the activities to determine whether the operations as a whole contain any new behavior patterns. As discussed above, known behavior patterns may be associated with known configuration changes that may be designed to address known performance issues. However, other performance issues may exist that do not correspond to known behavior patterns. In block 612, the operations are reviewed together to identify commonalities between the chains and, by doing so, identify new behavior patterns. The operations that are reviewed in block 612 may be those that are related to delays or resource consumptions above a threshold, such as those identified in block 514 of FIG. 5. For example, the operations may be reviewed to determine whether any type of repetition exists in the operations, either within an activity or between activities. Such repetition could be a sign of a potential performance issue in the configuration of the computing device that could be addressed with a change in configuration. For example, if multiple operations or information about multiple operations indicate that the operations were delayed waiting for the same function of the same process to complete execution, then this could be a sign of a potential performance issue in that function of that process. Similarly, if information about operations indicate that the same function of the same process is using a lot of resources, like a lot of memory or a lot of processor time, then this could be a sign of a potential performance issue in that function/process. By identifying the potential performance issue to a user, the function/process could be examined and an update made to that function/process to account for the performance issue.

In block 614, once the operations and activities have been reviewed, any potential new behavior patterns that have been identified from commonalities in the operations are added to the list of suggestions to be made to a user. Unlike the known behavior patterns, for which a known change in configuration can be suggested to the user, there may not be a known change in configuration to be made for these new behavior patterns. Instead, information about the new behavior patterns may be added to the suggestion list as suggestions for particular components of the computing device to investigate for changes to be made to the configuration. The information that is added to the suggestion list in block 614 may be information that identifies the operations and/or activities in which the commonalities were detected and the performance issue that was detected (e.g., delay or resource consumption), as well as other information that may be useful to the user in determining what the performance issue is such as information from chains and/or traces associated with operations.

Once the information about the new behavior pattern is added to the suggestion list in block 614, the process 600 ends.

Figure 7:
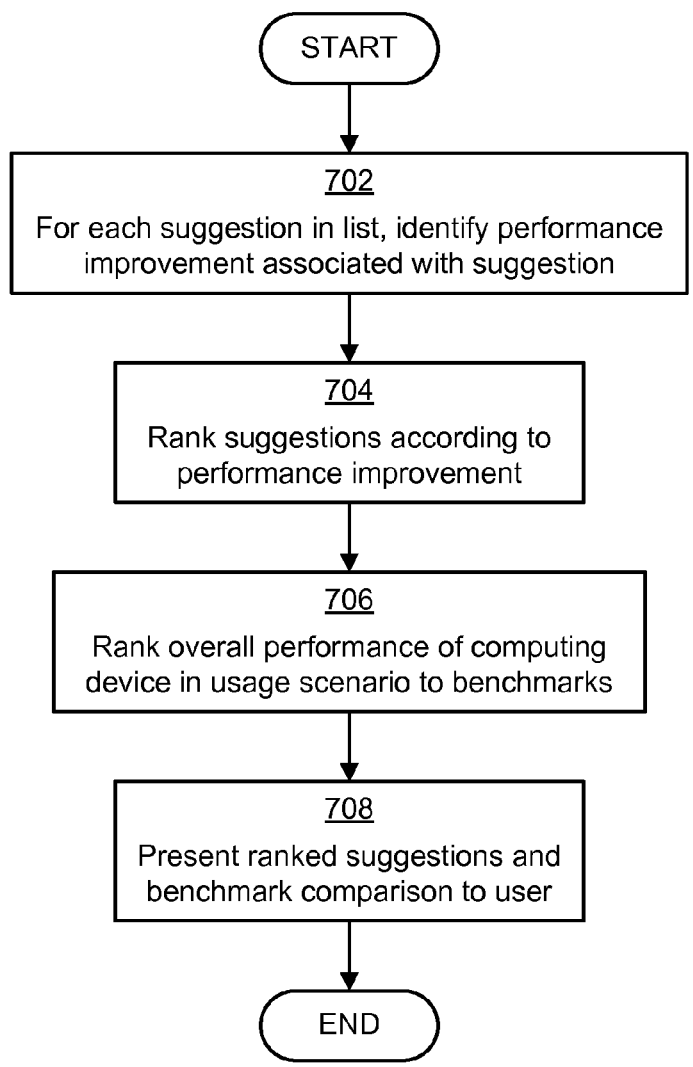
FIG. 7 is a flowchart of one exemplary process for outputting to a user suggestions regarding changes to be made to a configuration of a computing device to affect performance during a usage scenario.

After a suggestions list has been compiled that includes suggestions on how a configuration of a computing device can be changed and potential changes to investigate, the suggestions can be provided to a user. The suggestions can be provided as a report to a user in any suitable manner, including via any suitable user interface. FIG. 7 illustrates one example of a process 700 for providing such suggestions to a user.

Process 700 begins in block 702, in which the suggestions for changes to the configuration and/or potential changes to the configuration of the computing device are evaluated to determine a performance improvement for the computing device that could result from making the change or potential change. This performance improvement may be identified in any suitable manner. The performance improvement could be related to the performance detected during operation of the computing device in the usage scenario and by which behavior patterns were detected, such as actual delays or resources consumed that were previously identified, as discussed above. If the suggestion is related to a known behavior pattern, the known behavior pattern could be associated with a known improvement in performance. In block 704, based on the evaluation of block 702, the suggestions are ranked according to their potential impact on performance of the computing device in the usage scenario.

In block 706, the overall performance of the computing device in the usage scenario is examined and compared to benchmarks for performance of other types of computing devices that are operated in that usage scenario. Benchmarks per usage scenario may be maintained that indicate various performance metrics for multiple types of computing devices in the usage scenario, including total execution time and total resource consumption. These benchmarks may be obtained in any suitable manner, including by executing multiple computing devices in a usage scenario and collecting information on types of computing devices. Computing devices may be type-organized according to a configuration of the computing device, including a hardware configuration, such that computing devices that are similar in some ways can be compared to one another and to other computing devices that are less similar. The comparison of block 706 may be done so as to provide information to a user regarding how the computing device, with the current configuration, compares to other similar computing devices and to other computing devices. With this information, the user may be able to better evaluate whether to make the changes to the configuration recommended in the suggestions list that was ranked in block 704. For example, when the user is a factory worker preparing to manufacture computing devices in bulk, the factory worker may not want to make many changes in configuration. However, if the comparison of the computing device to other computing devices indicates that, with the current configuration, the computing device is performing poorly compared to competitors, the factory worker may be more likely to make changes to the configuration to improve performance and improve user experience.

In block 708, the ranked suggestion list and results of the comparison of block 706 are output to a user via any suitable interface. The process 700 then ends.

Above were described examples of techniques that may be used to evaluating performance of a computing device in a usage scenario to identify changes that can be made to a configuration of the computing device to affect performance and suggesting those changes to a user. By operating the computing device in the usage scenario, information about a current configuration of the computing device can be gathered and used to identify the changes that can be made. The changes can be identified based on a comparison of the current configuration to signatures for known behavior patterns, which could be related to known configuration changes that could improve performance. Additionally, new behavior patterns can be suggested as possible other ways to change the configuration to improve performance.

Figure 8:
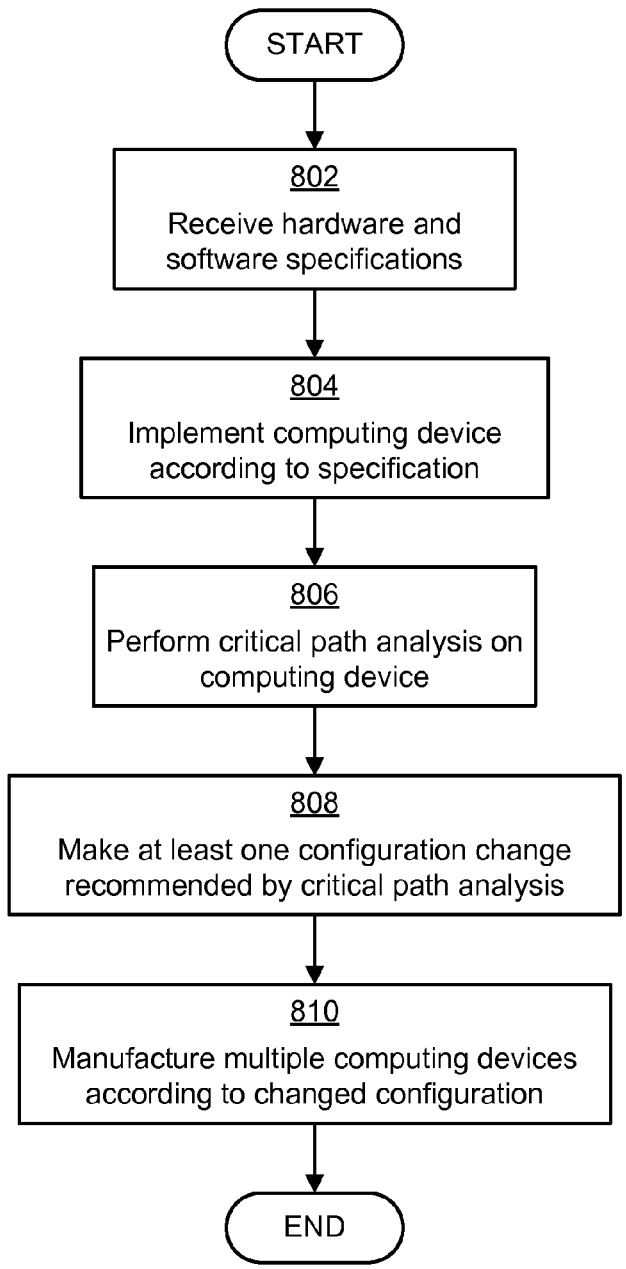
FIG. 8 is a flowchart of an exemplary process for manufacturing a computing device that includes evaluating a configuration of the computing device.

As discussed above, techniques described herein can be used in any suitable manner at any suitable time to identify ways to change a configuration of a computing device. In some cases, techniques can be used by a home user seeking to improve the performance of a personal computing device. In other cases, techniques can be used in a factory environment to identify ways in which to change a configuration of a computing device to be mass produced or that is being mass produced. FIG. 8 shows one example of a process for manufacturing a computing device using techniques operating according to some of the principles described herein.

Prior to the start of the process 800, hardware and software for a computing device have been designed and finalized, such that computing devices can be manufactured including the hardware and software. In some cases, some changes may have been made to the hardware and/or software after the configuration was finalized. For example, after the software was finalized the factory that is to produce the computing device or a vendor that is to sell the computing device may have agreed to install additional software on the computing device, on top of the designed software that was to be included in the computing device. This additional software may make changes to the configuration that affect performance of the computing device. The process 800 of FIG. 8 may be used to identify changes that could be made to the configuration (e.g., changes to be made to the hardware and/or software) to affect performance, including to improve performance.

The process 800 begins in block 802, in which hardware and software specifications are received. The hardware and software specifications may include the designed and finalized configuration of the computing device as well as any changes made by the factory or vendor. In block 804, a computing device is assembled according to the specifications received in block 802 and, in block 806, a process is carried out to test the computing device of block 804 in one or more usage scenarios and to identify changes that can be made to the configuration to affect performance. In block 808, the changes that can be made are received by a user and one or more changes are made to the configuration. In block 810, multiple computing devices are manufactured based on the changed configuration identified in block 808. The process 800 then ends.

Techniques operating according to the principles described herein may be implemented in any suitable manner. Included in the discussion above are a series of flow charts showing the steps and acts of various processes that can evaluate performance of a computing device in a usage scenario and suggest changes to be made to the configuration of the computing device to affect performance. The processing and decision blocks of the flow charts above represent steps and acts that may be included in algorithms that carry out these various processes. Algorithms derived from these processes may be implemented as software integrated with and directing the operation of one or more multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit, or of any particular programming language or type of programming language. Rather, the flow charts illustrate the functional information one of ordinary skill in the art may use to fabricate circuits or to implement computer software algorithms to perform the processing of a particular apparatus carrying out the types of techniques described herein. It should also be appreciated that, unless otherwise indicated herein, the particular sequence of steps and acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, or any other suitable type of software. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations needed to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package, for example as a software program application such as Microsoft® Windows® 8 Partner Kit or the Microsoft® Ecosystem Tool Suite. These functional facilities may, in alternative embodiments, be adapted to interact with other, unrelated functional facilities and/or processes, to implement a software program application. In other implementations, the functional facilities may be adapted to interact with other functional facilities in such a way as form an operating system, including the Windows® operating system, available from the Microsoft® Corporation of Redmond, Wash. In other words, in some implementations, the functional facilities may be implemented alternatively as a portion of or outside of an operating system.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 906 of FIG. 9 described below (i.e., as a portion of a computing device 900) or as a stand-alone, separate storage medium. As used herein, "computer-readable media" (also called "computer-readable storage media") refers to tangible storage media. Tangible storage media are non-transitory and have at least one physical, structural component. In a computer-readable medium, as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system. Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 9:
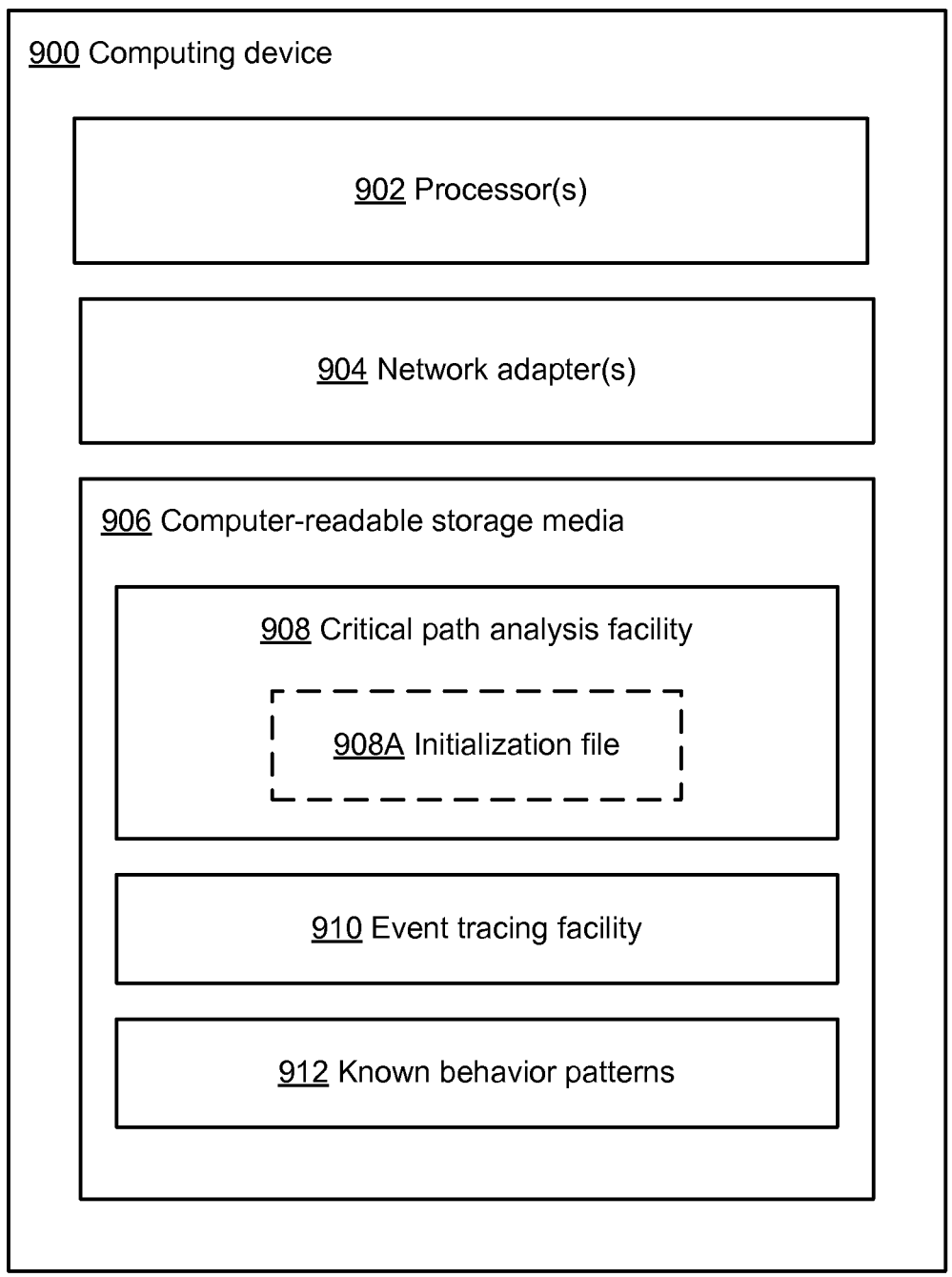
FIG. 9 is a block diagram of one exemplary type of computing device with which some embodiments may operate.

FIG. 9 illustrates one exemplary implementation of a computing device in the form of a computing device 900 that may be used in a system implementing the techniques described herein, although others are possible. It should be appreciated that FIG. 9 is intended neither to be a depiction of necessary components for a computing device to operate in accordance with the principles described herein, nor a comprehensive depiction.

Computing device 900 may comprise at least one processor 902, a network adapter 904, and computer-readable storage media 906. Computing device 900 may be, for example, a desktop or laptop personal computer, a personal digital assistant (PDA), a smart mobile phone, a server, a wireless access point or other networking element, or any other suitable computing device. Network adapter 904 may be any suitable hardware and/or software to enable the computing device 900 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 906 may be adapted to store data to be processed and/or instructions to be executed by processor 902. Processor 902 enables processing of data and execution of instructions. The data and instructions may be stored on the computer-readable storage media 906 and may, for example, enable communication between components of the computing device 900.

The data and instructions stored on computer-readable storage media 906 may comprise computer-executable instructions implementing techniques which operate according to the principles described herein. In the example of FIG. 9, computer-readable storage media 906 stores computer-executable instructions implementing various facilities and storing various information as described above. Computer-readable storage media 906 may store a critical path analysis facility 908 that may carry out a critical path analysis of the computing device 900 in a usage scenario using any of the exemplary techniques described above. The critical path analysis facility 908 may be configurable using an initialization file 908A, which may also be stored on the computer-readable storage media 906. An event tracing facility 910 may be stored on the computer-readable storage media 906, which may be configurable to store information about the state of the computing device 900 upon occurrence of an event, as discussed above. A data set 912 of known behavior patterns and signatures for known behavior patterns may also be stored on the computer-readable media 906.

While not illustrated in FIG. 9, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method comprising:
operating at least one programmed processor to carry out a set of acts, the at least one programmed processor programmed with processor-executable instructions that identify the set of acts, the set of acts comprising:
analyzing information about operations of a computing device generated during use of the computing device in a usage scenario;
identifying from the analyzed information at least one behavior pattern relating to performance of the computing device in the usage scenario; and
based at least in part on the at least one identified behavior pattern, presenting, on a display device, multiple suggestions that are ranked according to respective performance impacts associated with individual suggestions of the multiple suggestions for the computing device in the usage scenario, wherein the individual suggestions at least partially enable a user to effectuate at least one or more changes to a configuration of the computing device that would affect performance of the computing device in the usage scenario.

2. The method of claim 1, wherein:
the analyzing comprises comparing at least some of the information about operations to at least one known behavior pattern, where each at least one known behavior pattern is associated with a known configuration change that will affect performance of the computing device in the usage scenario, and
if a match is identified between the information about the operations and a first behavior pattern, at least one of the multiple ranked suggestions includes a first known configuration change associated with the first behavior pattern.

3. The method of claim 2, wherein:
comparing at least some of the information about operations to the at least one known behavior pattern comprises comparing at least some of the information about operations to first symptoms of a problem related to the first known behavior pattern, and
the first known configuration change comprises a solution associated with the first behavior pattern if at least some of the information about operations matches the first symptoms.

4. The method of claim 1, wherein:
the analyzing comprises analyzing chains of operations identified in the information about operations to identify at least one commonality between chains, the at least one commonality relating to execution of at least one software facility on the computing device; and
if at least one commonality is identified, the suggestion includes information regarding a change to the at least one software facility.

5. The method of claim 4, wherein identifying the at least one commonality comprises identifying the at least one commonality in a first trace and a second trace related to a first chain and a second chain identified in the information about operations.

6. The method of claim 4, wherein identifying the at least one commonality in the first chain and the second chain comprises identifying common thread identifiers, function names, and/or sequences of functions in a first chain and a second chain.

7. The method of claim 1, wherein:
the set of acts further comprises collecting tracing data upon occurrence of events during use of the computing device in the usage scenario, and
analyzing information about operations comprises analyzing the traces.

8. The method of claim 7, wherein the set of acts further comprises:
requesting collection of traces upon occurrence of the events based on an initialization file identifying how to monitor operation of the computing device in the usage scenario, the initialization file identifying the events for which traces are to be collected.

9. The method of claim 8, wherein:
the initialization file further identifies activity types and operations for the usage scenario, each of the activity types corresponding to at least one operation, each of the operations being related to an activity of a set of activities, and
the set of acts further comprises:
analyzing the traces to identify a set of operations that occurred during use of the computing device during the usage scenario;

analyzing the set of operations to determine the set of activities that form a part of the usage scenario on the computing device; and for each activity of the set of activities, identifying behavior patterns that occurred during the activity.

10. The method of claim 1, wherein:
the analyzing comprises analyzing the information about operations to determine resources consumed by operations that were carried out by the computing device during the usage scenario and, for an operation that consumes more resources than an average, determining that a known solution exists for reducing resources consumed during the operation; and
at least one of the multiple ranked suggestions includes the known solution.

11. The method of claim 1, wherein at least one of the multiple ranked suggestions includes information regarding at least one first change to hardware of the computing device and/or at least one second change to software of the computing device.

12. At least one computer-readable storage medium encoded with computer-executable instructions that, when executed, cause a computer to carry out a method, the method comprising:
analyzing information about operations of a computing device generated during use of the computing device in a usage scenario to identify a set of operations executed during the usage scenario;
comparing information regarding the set of operations to at least one known behavior pattern, where each of the at least one known behavior pattern is associated with a known configuration change that will affect performance of the computing device in the usage scenario;
analyzing the set of operations to identify whether at least one commonality exists between operations of the set, the at least one commonality relating to execution of at least one software facility on the computing device; and
presenting, on a display device, multiple suggestions that are ranked according to performance impacts associated with individual ones of the multiple suggestions, wherein the individual suggestions at least partially enable a user to effectuate at least one or more changes to a configuration of the computing device that would affect performance of the computing device in the usage scenario, wherein at least one of the multiple ranked suggestions comprises:
if a match is identified between the set of operations and a first known behavior pattern, a first known configuration change associated with the first known behavior pattern; and
if at least one commonality exists between operations of the set, a change to the at least one software facility related to the at least one commonality.

13. The at least one computer-readable storage medium of claim 12, wherein:
comparing information regarding the set of operations to the at least one known behavior pattern comprises comparing information regarding operations of the set to symptoms of a problem for which there is a known solution, and
at least one of the multiple ranked suggestions includes the known solution if at least some of the information regarding the set of operations matches the symptoms.

14. The at least one computer-readable storage medium of claim 12, wherein identifying the at least one commonality in operations of the set comprises identifying common thread identifiers, function names, and/or sequences of functions in a first chain and a second chain.

15. The at least one computer-readable storage medium of claim 12, wherein:
the method further comprises generating traces upon occurrence of events during operation of the computing device in the usage scenario, and
analyzing information about operations comprises analyzing the traces.

16. The at least one computer-readable storage medium of claim 15, wherein:
the method further comprises requesting generation of traces upon occurrence of the events based on an initialization file identifying how to monitor operation of the computing device in the usage scenario, the initialization file identifying the events for which traces are to be collected, and
the initialization file further identifying activities of the usage scenario, each of the activities comprising at least one event, each of the events being related to an activity of a set of activities, and
the set of acts further comprises:
analyzing the traces to identify a set of events that occurred during use of the computing device during the usage scenario;
analyzing the set of events to determine the set of operations and, based on the set of operations, the set of activities that form a part of the usage scenario on the computing device; and
for each activity of the set of activities, identifying behavior patterns in operations of the activity.

17. A method for manufacturing computing devices comprising:
receiving a first specification of hardware and a second specification of software for a first computing device to be manufactured;
operating the first computing device in a usage scenario;
receiving a suggested change to be made to the first specification and/or second specification that would, if made to the first computing device, affect operation of the first computing device in the usage scenario, the suggested change being suggested based on an automated analysis of information about operations of the first computing device generated during the operating of the first computing device in the usage scenario;
making the suggested change to the first specification and/or the second specification; and
manufacturing multiple other computing devices according to the changed first specification and the changed second specification.

18. The method of claim 17, wherein receiving a suggested change comprises receiving an indication that operations of the first computing device, when operated in the usage scenario, include a behavior pattern indicative of a known issue affecting performance in the usage scenario and receiving an indication that a known configuration change exists that is associated with the behavior pattern; and
wherein making the suggested change comprises making the known configuration change associated with the behavior pattern.

19. The method of claim 17, wherein receiving a suggested change comprises receiving an indication that operations of the first computing device, when operated in the usage scenario, include a behavior pattern related to a performance issue for which a solution is not known but that, if the performance issue is addressed, would improve performance of the first computing device; and wherein making the suggested change comprises making a change to the configuration to address the performance issue.

20. The method of claim 17, wherein the performance issue comprises an execution delay and/or a level of resource consumption, and
wherein the suggested change comprises a change that reduces the execution delay and/or the level of resource consumption.

* * * * *